(No Model.)
F. B. HANSON.
WATER CLOSET.
No. 308,358. Patented Nov. 25, 1884.
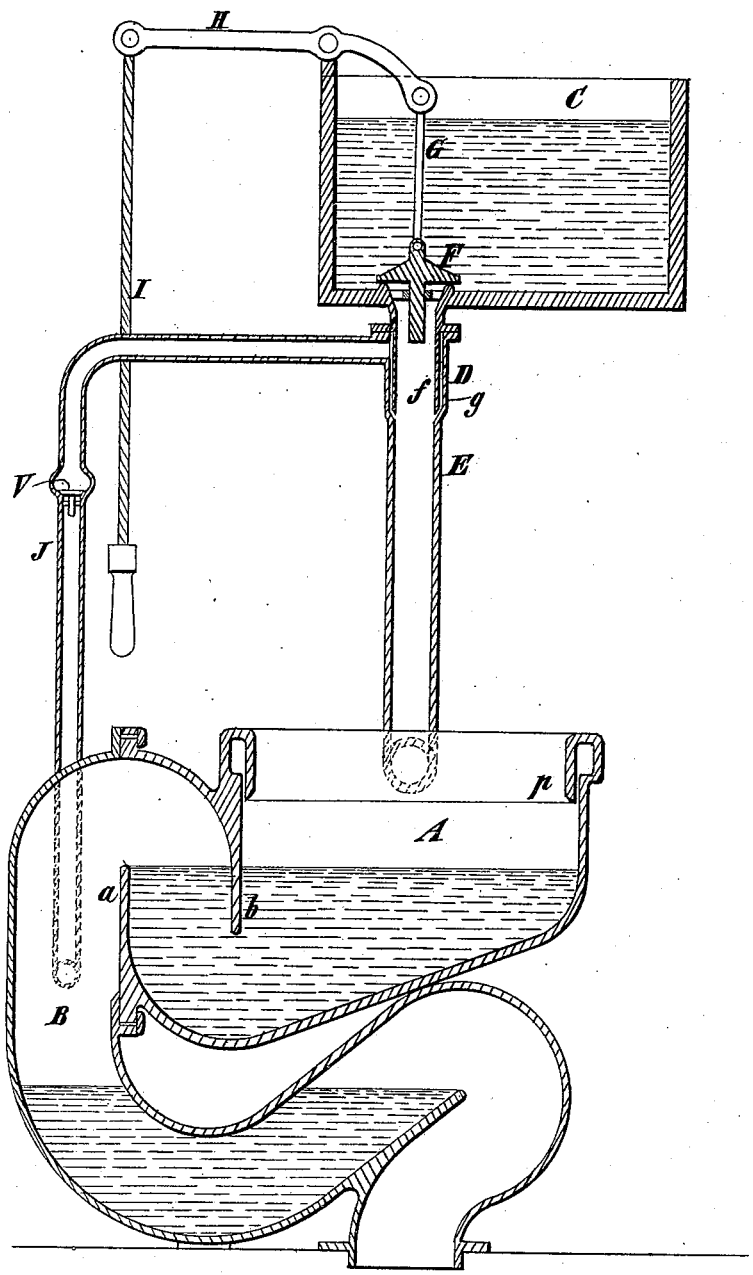
Witnesses:
C. Lundgren
James R. Bowen
Inventor:
Frank B. Hanson
by his attorney,
Edwin H. Brown

UNITED STATES PATENT OFFICE.

FRANK B. HANSON, OF NEW YORK, N. Y.

WATER-CLOSET.

SPECIFICATION forming part of Letters Patent No. 308,358, dated November 25, 1884.

Application filed June 12, 1883. (No model.)

*To all whom it may concern:*

Be it known that I, FRANK B. HANSON, of New York, in the county of New York and State of New York, have invented a certain new and useful Improvement in Water-Closets, of which the following is a specification.

In my water-closet the basin is so constructed as to form a stench-trap, and below the basin there is another stench-trap. Between these stench-traps is a pipe extending to an injector, through which the flushing-water passes to the basin. Water passing to the basin, therefore, produces a vacuum below the upper or basin stench-trap and induces the water to flow therefrom into the lower stench-trap.

The accompanying drawing is a central vertical section of a water-closet basin and appurtenances embodying my improvement.

A designates a basin, which may be made of earthenware or any other suitable material. It has a side outlet, and at the outlet is provided with an upwardly-extending flange, $a$, and a downwardly-extending flange, $b$. The flange $a$ extends above the bottom of the flange $b$. From the outlet of the basin a pipe or passage, B, which may be made of iron or of the same kind of material as the basin, extends downwardly, then upwardly, and then downwardly again, to connect with the waste-pipe of the water-closet. The peculiar form of this pipe or passage causes water to lodge in it to such an extent as to close it or obstruct the passage of gases through it. It therefore forms a stench-trap. The extension of the flange $a$ above the lower edge or bottom of the flange $b$ causes water to lodge in the basin and forms a stench-trap in the basin, preventing gases from rising from the pipe or passage B into the basin.

C designates a tank containing water for flushing the basin.

D designates an injector connected to the lower part of the tank C.

E designates a pipe leading from the injector D to a passage, $p$, around the upper part of the basin A, and conducting water to this passage. The water is supplied to this passage and escapes around the lower edge into the basin. As here shown, the inner tube, $f$, of the injector is formed with the tank, and the outer tube, $g$, of the injector is formed with the pipe E; but the injector may be entirely separate from the said tank and pipe, and connected thereto by bolts or otherwise. Communication between the tank and the inner tube, $f$, of the injector may be controlled by a valve, F. The valve shown is a puppet-valve, and its spindle or stem is connected by a link, G, to a lever, H, which is fulcrumed to a stand erected on the tank. The lever H may be operated so as to open the valve F by pulling on a cord, I, which is attached to it so as to hang down near the basin. A pipe, J, extends from that portion of the pipe or passage B which is between the two stench-traps to the outer tube, $g$, of the injector; hence when the valve F is opened and water flows through the inner tube of the injector to the basin, air is drawn through the outer tube, $g$, of the injector from the pipe J, and a partial vacuum formed in that portion of the pipe or passage B which is between the two stench-traps. The water is thus caused to flow under the influence of atmospheric pressure from the upper stench-trap into the pipe or passage B. A valve, V, may be arranged in the pipe J, so as to close the same except when the injector operates to exhaust air from the pipe. The valve shown is a puppet-valve, and seats itself by its gravity for the purpose of closing the pipe. It is raised from its seat to open the pipe by the air which is drawn out by the injector.

What I claim as my invention, and desire to secure by Letters Patent, is—

1. The combination, with a water-closet basin formed to constitute a stench-trap, a waste pipe or passage leading therefrom, and so constructed as to form a stench-trap, a source of water, a pipe for conveying water to the basin, and an air-pipe leading from the space in the waste pipe or passage which is between the stench-traps, of an injector connected with the said water-pipe and the air-pipe, and serving to produce a partial vacuum in said space by the flow of water through the injector, substantially as specified.

2. The combination, with a water-closet basin formed to constitute a stench-trap, a waste pipe or passage leading therefrom, and so constructed as to form a stench-trap, a water-tank, a water-pipe leading from the tank to the basin, and an air-pipe leading from the space in the waste-pipe which is between the stench-traps, of the injector D, having its inner tube connected with the water-tank and in communication with the water-pipe, and its outer tube in communication with the air-pipe and the water-pipe, whereby the flow of water from the tank through the injector is made to produce a partial vacuum in said space, the valve F, the lever H, connected thereto, and the cord I, substantially as specified.

3. The combination, with a water-closet basin formed to constitute a stench-trap, a waste pipe or passage leading therefrom, and so constructed as to form a stench-trap, a source of water, a pipe for conveying water to the basin, and an air-pipe leading from the space in the waste pipe or passage which is between the stench-traps, of an injector connected with the water-pipe and the air-pipe, and serving to produce a partial vacuum in said space by the flow of water through the injector, and a valve in said air-pipe between said space and the injector, substantially as specified.

FRANK B. HANSON.

Witnesses:
T. J. KEANE,
JAMES R. BOWEN.